(12) United States Patent
Fors et al.

(10) Patent No.: US 7,440,911 B1
(45) Date of Patent: Oct. 21, 2008

(54) DISTRIBUTED QUOTE MANAGEMENT

(75) Inventors: John Fors, Menlo Park, CA (US); Ramakrishna Mantripragada, Sunnyvale, CA (US); Paul Burich, Milpitas, CA (US); Larry Recht, Newport Beach, CA (US); Nameeta Aulakh, Coppell, TX (US); James Richard Allison, San Jose, CA (US); Gayle Hayes, Cupertino, CA (US)

(73) Assignee: i2 Technologies, US, Inc., Dallas, TX (US)

( * ) Notice: Subject to any disclaimer, the term of this patent is extended or adjusted under 35 U.S.C. 154(b) by 786 days.

(21) Appl. No.: 10/153,844

(22) Filed: May 21, 2002

Related U.S. Application Data

(60) Provisional application No. 60/298,635, filed on Jun. 15, 2001.

(51) Int. Cl.
  *G06Q 30/00* (2006.01)
(52) U.S. Cl. .......................................... 705/26; 705/27
(58) Field of Classification Search ................... 705/26, 705/27, 38, 37, 7
See application file for complete search history.

(56) References Cited

U.S. PATENT DOCUMENTS

| | | | | |
|---|---|---|---|---|
| 2001/0056398 A1* | 12/2001 | Scheirer | ...................... | 705/38 |
| 2002/0032610 A1* | 3/2002 | Gold et al. | .................... | 705/20 |
| 2002/0072987 A1* | 6/2002 | Knudsen et al. | ................ | 705/26 |
| 2002/0082849 A1* | 6/2002 | Tenorio | .......................... | 705/1 |
| 2002/0174000 A1* | 11/2002 | Katz et al | ....................... | 705/7 |
| 2002/0198818 A1* | 12/2002 | Scott et al. | .................... | 705/37 |
| 2003/0014356 A1* | 1/2003 | Browne et al. | ................ | 705/38 |

OTHER PUBLICATIONS

"Protel International and WebQuote Software Enter into Partnership; Users of Protel's P-CAD 2001 Package Benefit from WebQuotes On-Line PCB Quoting Service"; Business Editors; Business Wire; New York; Apr. 3, 2001 and screen captures of WebQuote.com.*
"Methodologies for rapid and effective response to requests for quotation (RFQ's)"; Dharmerja Veeramani; IEE Transactions; Norcross; Oct. 1997.*
Scott-2, referenced Docket M-8661 US from PG Pub 20020198818, U.S. Appl. No. 09/571,792, dated May 16, 2000, now abandoned drawings and specification, 149 pages.*

* cited by examiner

*Primary Examiner*—Mark Fadok
(74) *Attorney, Agent, or Firm*—Steven J. Laureanti; Booth Udall, PLC

(57) ABSTRACT

A method for distributed quote management includes receiving a buyer request for quote (RFQ) from a buyer. The buyer RFQ requests a quote from a seller and identifies multiple items. The method includes automatically determining a best cost of each item in the buyer RFQ. The method includes automatically generating a quote for the buyer RFQ using the determined best costs of the items in the buyer RFQ. The method includes automatically generating a bid package for the buyer RFQ that includes the generated quote and automatically communicating the generated bid package to the buyer.

33 Claims, 2 Drawing Sheets

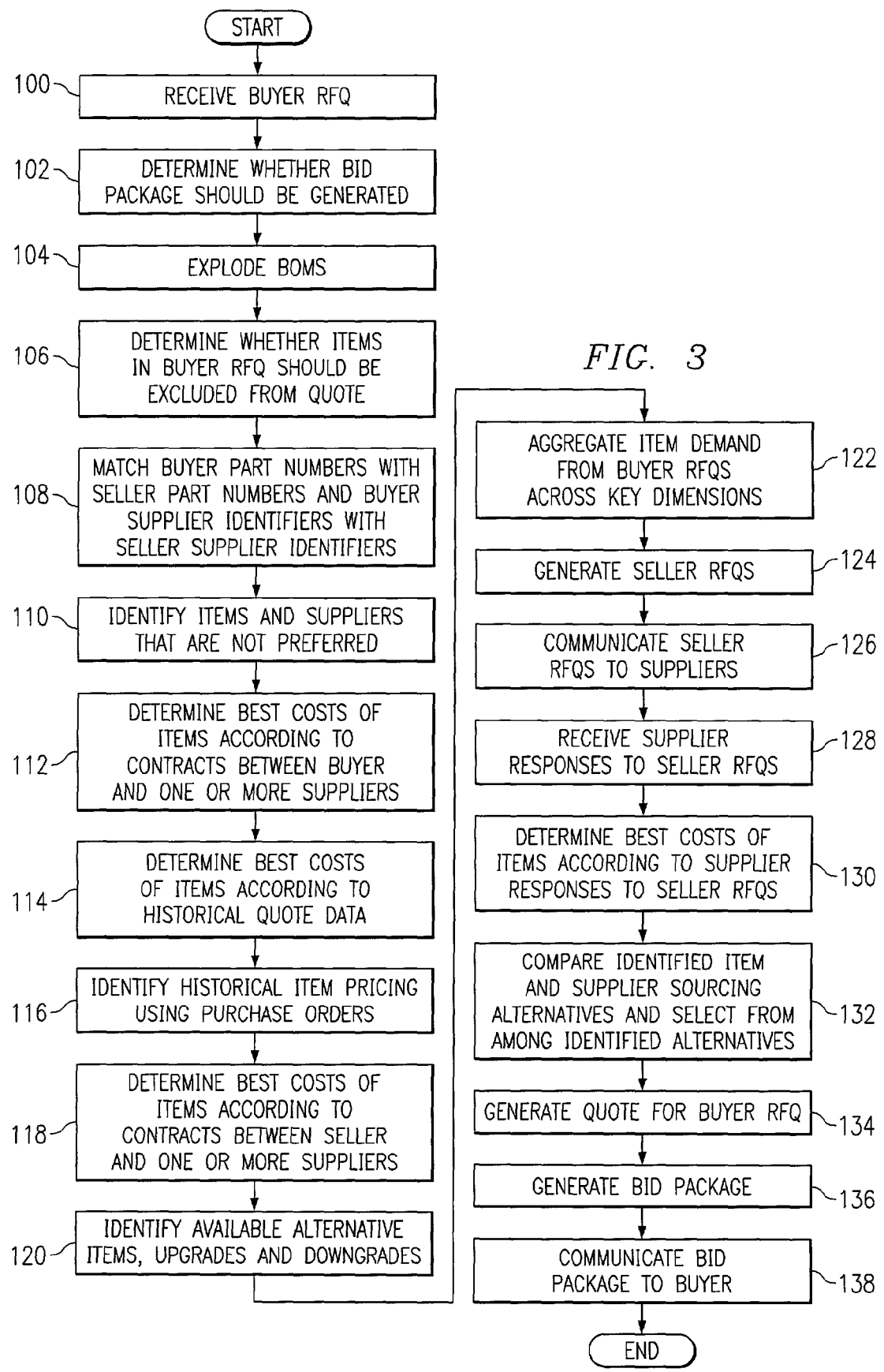

DISTRIBUTED QUOTE MANAGEMENT

RELATED APPLICATION

This application claims the benefit of U.S. Provisional Application Ser. No. 60/298,635 filed Jun. 15, 2001.

TECHNICAL FIELD OF THE INVENTION

This invention relates generally to electronic commerce and more particularly to distributed quote management.

BACKGROUND OF THE INVENTION

Quote management may be an important business process. For example, effective quote management may enable a seller to respond more quickly to requests for quote (RFQs), which may give the seller a competitive advantage over other sellers. Effective quote management may also reduce the occurrence of quote errors and associated costs incurred by the seller. Inversely, ineffective quote management may hinder efforts to respond quickly to RFQs, which may give other sellers a competitive advantage over the seller. Ineffective quote management may also increase the occurrence of quote errors and associated costs incurred by the seller. However, quote management has traditionally been a complicated process involving a substantial amount of time, expense, and other resources.

SUMMARY OF THE INVENTION

According to the present invention, disadvantages and problems associated with previous quote management and optimization techniques may be substantially reduced or eliminated.

In one embodiment of the present invention, a method for distributed quote management includes receiving a buyer request for quote (RFQ) from a buyer. The buyer RFQ requests a quote from a seller and identifies multiple items. The method includes automatically determining a best cost of each item in the buyer RFQ. The method includes automatically generating a quote for the buyer RFQ using the determined best costs of the items in the buyer RFQ. The method includes automatically generating a bid package for the buyer RFQ that includes the generated quote and automatically communicating the generated bid package to the buyer.

Particular embodiments of the present invention may provide one or more technical advantages. Particular embodiments may provide effective quote management, which may in turn provide a number of advantages. For example, particular embodiments may determine a best cost of each item in a buyer RFQ and generate a quote for the buyer RFQ that reflects the determined best costs of the items in the buyer RFQ. As a result, a seller responding to a buyer RFQ may generate more competitive quotes. Particular embodiments may generate a quote for a buyer RFQ that includes substantially optimal costs selected from several possible item alternatives, supply sources, and contract price arrangements for fulfilling the request. Particular embodiments may enable a seller to respond more quickly to RFQs, which may give the seller a competitive advantage over other sellers. Particular embodiments may reduce quote errors (such as data entry errors) and associated costs (such as underbidding costs) incurred by the seller. Particular embodiments may also reduce time requirements associated with handling "add-ons" and "re-orders" from buyers. Furthermore, particular embodiments may reduce time requirements and costs associated with generating quotes. Certain embodiments may also reduce material costs incurred as a result of the seller overlooking opportunities to purchase less expensive component parts or raw materials, opportunities to consolidate purchases to take advantage of supplier discounts, and other opportunities.

In addition, particular embodiments may reduce inventory requirements associated with incorrectly ordered component parts and raw materials. Particular embodiments may similarly reduce inventory requirements associated with component parts and raw materials purchased unnecessarily from suppliers to meet supplier quantity minimums where purchases could have been consolidated, but opportunities to do so were overlooked by the seller. Particular embodiments may provide for better handling of buyer data contained in RFQs. For example, particular embodiments may provide cleansing, matching, and analyzing of buyer data contained in RFQs. Particular embodiments may also provide support for joint collaborations between buyers and sellers and between sellers and suppliers. Particular embodiments may allow a seller to better capitalize on up-sell and cross-sell opportunities. Certain embodiments may provide all, some, or none of these technical advantages, and certain embodiments may provide one or more other technical advantages which may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description, taken in conjunction with the accompanying drawings, in which:

FIG. 3 illustrates an example method for distributed quote management.

DESCRIPTION OF EXAMPLE EMBODIMENTS

Figure 1:
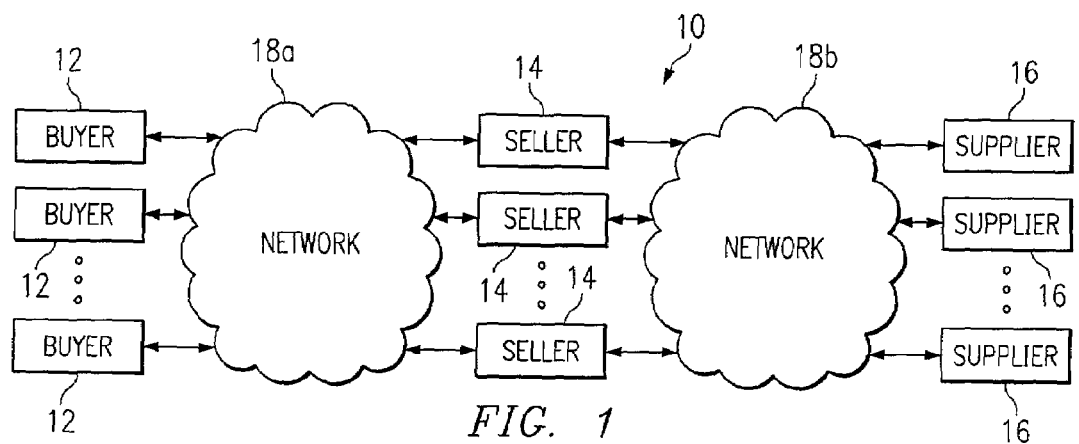
FIG. 1 illustrates an example system supporting an RFQ environment.

FIG. 1 illustrates an example system 10 supporting an RFQ environment. System 10 may include one or more buyers 12, one or more sellers 14, one or more suppliers 16, and one or more networks 18. Network 18a may couple buyers 12 to sellers 14 and may include any appropriate combination of public networks, private networks, or both coupling buyers 12 to sellers 14. For example, network 18a may include one or more links that each include one or more computer buses, local area networks (LANs), metropolitan area networks (MANs), wide area networks (WANs), portions of the Internet, or any other appropriate wireline, optical, wireless, or other links. Network 18b may similarly couple sellers 14 to suppliers 16. Although networks 18 are described, the present invention contemplates any suitable communication environment supporting communication among buyers 12, sellers 14, and suppliers 16. Although one network 18a is described and illustrated as coupling buyers 12 to sellers 14 and another network 18b is described and illustrated as coupling buyers 12 to suppliers 16, a single network 18 may, in addition or as an alternative, couple buyers 12, sellers 14, and suppliers 16 to each other.

A buyer 12 may include any suitable entity buying items from one or more sellers 14. For example, a buyer 12 may include an original equipment manufacturer (OEM) that buys items from one or more sellers 14 for use in equipment manufacturing. Items may include raw materials, component parts, products, or other items that may be the subject of a transaction between a buyer 12 and a seller 14 and may include lots, blocks, bundles, bushels, or other suitable units of one or more items. An item may include one or more other items. A seller 14 may include any suitable entity selling items to one or more buyers 12. For example, a seller 14 may include a contract manufacturer (CM) that manufactures items for one or more buyers 12 on a contract or other basis. Although buyers 12 and sellers 14 are illustrated and described as separate entities (as may be the case in typical contract-manufacturing and outsourcing situations), one or more buyer 12 and sellers 14 may in particular embodiments be associated with each other. For example, a buyer 12 and a seller 14 may be different departments within a single organization. In such cases, buyer 12 may act as a requestor and seller 14 may act in a corporate procurement role. A supplier 16 may include any entity that supplies one or more sellers 14. For example a supplier 16 may include an up-stream supplier that provides items to one or more sellers 14 for use in manufacturing items for buyers 12. Although buyers 12, sellers 14, and suppliers 16 are described and illustrated as separate entities, the present invention contemplates any suitable relationship among these entities. For example, a single enterprise or other organization may include one or more buyers 12, one or more sellers 14, and one or more suppliers 16. In addition or as an alternative, one or more of buyers 12, sellers 14, and suppliers 16 may include entities independent of each other.

In an RFQ environment, a buyer 12 may communicate a buyer RFQ to one or more sellers 14. As an example only and not by way of limitation, a buyer RFQ may include one or more items for which a quote is requested, a bill of materials (BOM) for each such item (which may include a number of items), and an approved supplier list for each item in the RFQ (including items in any BOMs in the RFQ). Although buyer RFQs are described as including BOMs, a buyer RFQ may include any suitable format. For example, a buyer RFQ may simply include one or more lists of one or more items. The present invention contemplates any suitable format for buyer RFQs. An approved supplier list may include an approved manufacturer list (AML), an approved vendor list (AVL), or any other suitable approved supplier list. A buyer RFQ may also include one or more relevant contracts between a buyer 12 and one or more suppliers 16. For example, there may be a contract between a buyer 12 and a supplier 16 affecting the prices of items available to a seller 14 from supplier 16.

A seller 14 may receive the buyer RFQ and, in response to receiving the buyer RFQ, generate a quote for the buyer RFQ. To do this, seller 14 may generate one or more seller RFQs for communication to one or more suppliers 16. As an example only and not by way of limitation, a seller RFQ may include one or more items for which a quote is requested, which items may be used to provide one or more other items in the buyer RFQ. Seller 14 may receive one or more supplier responses to the seller RFQs and, using the received supplier responses, generate a quote for the buyer RFQ and communicate the quote to buyer 12. The communicated quote may be accepted or rejected by buyer 12 or provide a starting point for negotiations between buyer 12 and seller 14. Although an example RFQ environment is described, the present invention contemplates any suitable environment in which RFQs or similar requests are communicated. For example, the present invention contemplates request for proposal (RFP) environments, request for information (RFI) environments, and any other suitable environments.

Responding to buyer RFQs may be an important business process for a seller 14. Responding quickly to buyer RFQs may give seller 14 a competitive advantage over other sellers 14, whereas delays may give other sellers 14 a competitive advantage over seller 14. In addition, improper handling of responses to buyer RFQs may result in quote errors and seller 14 incurring associated costs. Despite the importance of responding quickly and properly handling responses, traditional techniques for responding to buyer RFQs involve one or more persons manually performing many, or in some cases all, of the tasks associated with generating responses to buyer RFQs. As a result, it may be difficult to respond quickly to buyer RFQs using traditional techniques and human error may plague the handling of such responses.

Figure 2:
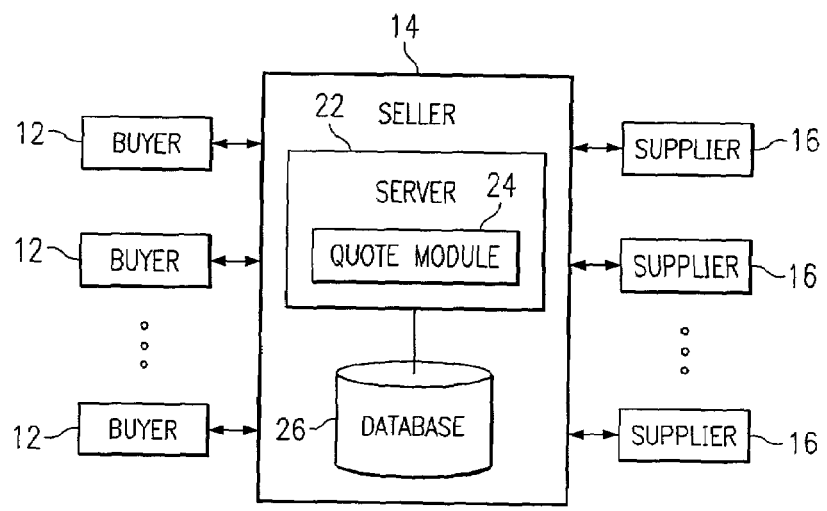
FIG. 2 illustrates an example system for distributed quote management.

FIG. 2 illustrates an example system 20 for distributed quote management. System 20 may include a buyer 12, a seller 14, and a number of suppliers 16. Seller 14 may include one or more servers 22 which may each include one or more computer systems. Servers 22 may include one or more quote modules 24 (which may be implemented as any suitable combination of hardware and/or software) which may generate quotes for buyer RFQs. Seller 14 may also include one or more databases 26 accessible to server 22 which may include buyer profile data, historical quote data, contract data, and any other suitable data. A database 26 may include any suitable data storage arrangement. In general, a quote module 24 may receive a buyer RFQ from a buyer 12, process the buyer RFQ (which may include determining a best cost of each item in the buyer RFQ), generate a quote for the buyer RFQ, and communicate the generated quote to buyer 12 in a bid package as described more fully below. A best cost of an item may include a low cost (which may include a lowest available cost) of the item, an optimal cost, or any other suitable cost. Upon receiving a buyer RFQ, quote module 24 may access part numbers for items in the RFQ. A part number may include any suitable information for identifying a particular item. Part numbers for items in a buyer RFQ may include buyer part numbers, which may include part numbers created by buyer 12, standard part numbers, or any other particular numbers used by buyer 12.

In particular embodiments, quote module 24 may access one or more buyer profiles for buyer 12 to determine whether a quote should be generated for the buyer RFQ and communicated to buyer 12. For example, quote module 24 may access a buyer profile for buyer 12 and, based on information in the buyer profile, determine that it is substantially unlikely that buyer 12 will accept a quote for the RFQ from seller 14 and thus a quote should not be generated for the buyer RFQ and communicated to seller 14. Data reflecting buyer profiles may be stored in database 26. A buyer profile may include any suitable information regarding a buyer 12. For example only and not by way of limitation, a buyer profile may include information reflecting one or more "win" ratios (which may reflect the number of quotes from seller 14 which buyer 12 has accepted over a period of time in comparison with the number of quotes from seller 14 which buyer 12 has rejected over the same period of time), information identifying one or more other sellers 14 competing with seller 14 for business from buyer 12, information reflecting the competitiveness of seller 14 in comparison with the competitiveness of such other sellers 14, information reflecting one or more sales volumes between buyer 12 and seller 14, information reflecting one or more differences between actual sales volumes and contract sales volumes between buyer 12 and seller 14, information reflecting margins on sales between buyer 12 and seller 14, and any other suitable information. Quote module 24 may use any suitable combination of such information to determine whether a quote should be generated for the buyer RFQ.

In particular embodiments, quote module 24 may match one or more buyer part numbers for one or more items in the buyer RFQ with one or more seller part numbers (which may include part numbers created by seller 14, standard part numbers, or other part numbers used by seller 14). A buyer part number may be matched with a seller part number in any suitable manner. For example, a buyer part number may be matched with a seller part number using an intelligent BOM-matching algorithm or any other suitable algorithm. Matching buyer part numbers with seller part numbers may, in particular embodiments, include cleansing one or more buyer part numbers such that they may be matched by quote module 24 with one or more seller part numbers. For example, a buyer part number for an item in the buyer RFQ may include only a portion of a standard part number that may be identified by quote module 24 for purposes of matching the buyer part number with a seller part number. Quote module 24 may cleanse the buyer part number to identify the corresponding standard part number, allowing the buyer part number to be matched with a seller part number.

In addition or as an alternative to quote manager 24 matching buyer part numbers with seller part numbers, quote manager 24 may match one or more buyer supplier identifiers (which may include identifiers used by buyer 12 to identify suppliers 16) in one or more approved supplier lists in the buyer RFQ with one or more seller supplier identifiers (which may include identifiers used by seller 14 to identify suppliers 16). A supplier identifier may include any suitable data identifying one or more suppliers 16. For example, a supplier identifier may include one or more numbers, letters, or both identifying one or more suppliers 16. Similar to part numbers, supplier identifiers may be matched with each other in any suitable manner and may, in particular embodiments, include supplier identifier cleansing. Matched part numbers, matched supplier identifiers, or both may be used by quote module 24 to determine best costs of one or more items in the buyer RFQ or identify one or more up-sell or cross-sell opportunities, as described more fully below.

Quote module 24 may determine a best cost of one or more items in the buyer RFQ. Any suitable technique or techniques may be used to determine a best cost of an item. In particular embodiments, quote module 24 may use one of several different techniques to determine a best cost of a particular item in the buyer RFQ. Certain of the different techniques may be preferred over others, and quote module 24 may determine which of the different techniques to use based on the availability of certain data. In particular embodiments, quote module 24 may determine multiple best costs of an item using multiple techniques and compare the determined best costs with each other to determine a suitable best cost from among the best costs of the item determined using the different techniques.

One example technique for determining a best cost of an item may include quote module 24 determining whether there are one or more contracts between buyer 12 and one or more suppliers 16 that may affect prices at which the item is available to seller 14 from suppliers 16 (and thus may affect best costs of such items). If quote module 24 determines that one or more such contracts exist, quote module 24 may access data reflecting the contracts and determine a best cost of the item according to the contracts. For example, the buyer RFQ may include a contract between buyer 12 and a supplier 16 under the terms of which one or more items in the RFQ are available to seller 14 from supplier 16 at prices substantially lower than prices available from other suppliers 16. Herein, reference to a "contract" may where appropriate include contract pricing information from a contract that may be used to automatically determine prices at which items are available to seller 14 under the terms of the contract and/or any other appropriate terms or data from a contract. In addition or as an alternative to the buyer RFQ including one or more contracts between buyer 12 and one or more suppliers 16, database 26 may include data reflecting such contracts, and quote module 24 may access such data.

Another example technique for determining a best cost of an item may include quote module 24 determining whether there is any available historical quote data (in database 26 or elsewhere) for the item. If quote module 24 determines that such data is available, quote module 24 may access the historical quote data for the item and determine a best cost of the item according to the historical quote data for the item. Such data may include data reflecting past quotes communicated by seller 14, best cost determinations made by seller 14 in the past, or any other suitable data. For example, quote module 24 may access a buyer part number for an item in the buyer RFQ and possibly one or more other portions of the RFQ (such as an approved supplier list) and compare the accessed part number (and possibly other accessed portions of the RFQ) with historical quote data in database 26 to determine whether a best cost of the item has previously been determined. If so, the previously determined best cost of the item may be used as a best cost of the item for purposes of generating a quote for the buyer RFQ.

Another example technique for determining a best cost of an item may include quote module 24 determining whether there are one or more contracts between seller 14 and one or more suppliers 16 that may affect the best cost at which the item is available to seller 14 from suppliers 16. If one or more such contracts exist, quote module 24 may access data reflecting the contracts and determine a best cost of the item according to the contracts. Data reflecting such contracts may be stored in database 26. Another example technique for determining a best cost of an item may include quote module 24 accessing inventory data for seller 14 (which may be stored in database 26) and determining whether item is available from the inventory of seller 14. If quote module 24 determines the item is available from the inventory of seller 14, quote module 24 may access inventory price data (which may be stored in database 26) for the item and determine a best cost of the item according to the inventory price data for the item. Another example technique for determining a best cost of an item may include quote module 24 generating one or more seller RFQs for communication to one or more suppliers 16. Quote module may communicate the generated seller RFQs to suppliers 16, receive one or more supplier responses to the seller RFQs, and determine a best cost of the item according to the supplier responses to the seller RFQs.

As described above, quote module 24 may in particular embodiments use one of these or other suitable techniques to determine a best cost of a particular item in the buyer RFQ. Additionally, certain of the techniques may be preferred over others, and quote module 24 may determine which of the different techniques to use based on the availability of certain data. For example, quote module 24 may attempt to determine a best cost of an item according to one or more contracts between buyer 12 and one or more suppliers 16 affecting a best cost of the item. If no such contracts exist (or data reflecting such contracts is unavailable), quote module 24 may attempt to determine a best cost of the item according to historical quote data for the item. If historical quote data for the item is unavailable, quote module 24 may attempt to determine a best cost of the item according to one or more contracts between seller 14 and one or more suppliers 16 affecting a best cost of the item. If no such contracts exist (or data reflecting such contracts is unavailable), quote module may attempt to determine a best cost of the item according to inventory price data for the item. If the item is not available from the inventory of seller 14 or inventory price data for the item is unavailable, quote module 24 may generate one or more seller RFQs and determine a best cost of the item according to one or more supplier responses to the seller RFQs. Although quote module 24 has been described as determining a best cost of an item using only one technique, quote module 24 may in addition or as an alternative determine multiple best costs of an item using multiple techniques and compare the determined best costs with each other to determine a suitable best cost from among the best costs of the item determined using the different techniques.

Quote module 24 may determine whether there are any up-sell or cross-sell opportunities associated with one or more items in the buyer RFQ. As an example, quote module 24 may, using a seller part number matched with a buyer part number for an item in the buyer RFQ, identify one or more other items (which may be available from seller 14 or one or more suppliers 16) that may provide buyer 12, seller 14, or both one or more advantages over the item in the buyer RFQ. As another example, quote module 24 may identify one or more other items (which may be available from seller 14 or one or more suppliers 16) that buyer 12 may purchase in addition to the items in the buyer RFQ. Data for determining whether such opportunities exist and identifying such opportunities may be stored in database 26. Any suitable up-sell or cross-sell opportunities may be identified by quote module 24. As described more fully below, such opportunities may be communicated to buyer 12 in a bid package that includes a quote for the buyer RFQ.

Quote module 24 may generate a quote for the buyer RFQ by adding the determined best costs of the items in the buyer RFQ and adding any associated costs (such as costs associated with labor, assembly, or margin or any other suitable associated costs). Because the best costs determined by quote module 24 may in particular embodiments include a low cost or an optimal cost, the quote generated by quote module 24 may reflect low or optimal costs of the items in the buyer RFQ, which may result in a more competitive quote from seller 14. Where items are grouped in one or more BOMs (which may or may not be the case), quote module 24 may generate a quote by costing each BOM (which may include adding the determined best costs of the items in the BOM and adding any associated costs) and combining the costed BOMs. As described above, a buyer RFQ may include any suitable format and need not include one or more BOMs. In such cases, quote module 24 may generate a quote for a buyer RFQ by simply adding the determined best costs of the items in the buyer RFQ and adding any associated costs.

Quote module 24 may generate a bid package for the buyer RFQ. The bid package may include a quote for the buyer RFQ, one or more identified up-sell or cross-sell opportunities, proposed contract terms, and any other suitable information regarding the buyer RFQ. Quote module 24, in particular embodiments, may determine whether one or more elements of the bid package (which may include one or more portions of the quote for the buyer RFQ, one or more contract terms, one or more up-sell or cross-sell opportunities, or any other suitable elements of the bid package) require approval from one or more persons. If an element of the bid package requires such approval, quote module 24 may communicate any suitable information to the persons from whom approval is required and obtain the required approval before communicating the bid package to buyer 12. Quote module 24 may communicate the generated bid packages to buyer 12, and buyer 12 may receive the bid package and accept or reject it or begin negotiations with seller 14 regarding the bid package to reach an agreement between buyer 12 and seller 14. Such negotiations may include buyer 12 selecting one or more up-sell or cross-sell opportunities identified by quote module 24.

In particular embodiments, quote module 24 may handle "add-ons" and "re-orders" from buyer 12. As an example only and not by way of limitation, buyer 12 may, after communicating a buyer RFQ to seller 14 and before receiving a bid package for the buyer RFQ from seller 14, make one or more changes to the buyer RFQ and communicate the changes to seller 14. Quote module 24 may receive the changes to the buyer RFQ from buyer 12 and, in response, incorporate the changes into one or more portions of a bid package subsequently communicated to buyer 12. As another example, buyer 12 may receive a bid package from seller 14 for a buyer RFQ from buyer 12 and, in response, make one or more changes to the buyer RFQ and communicate the changes to seller 14. Quote module 24 may receive the changes to the buyer RFQ from buyer 12 and, in response, generate a new bid package for the buyer RFQ that incorporates the changes to the buyer RFQ and communicate the new bid package to buyer 12.

Particular embodiments of the present invention may provide one or more technical advantages. Particular embodiments may provide effective quote management, which may in turn provide a number of advantages. For example, particular embodiments may determine a best cost of each item in a buyer RFQ and generate a quote for the buyer RFQ that reflects the determined best costs of the items in the buyer RFQ. As a result, a seller responding to a buyer RFQ may generate more competitive quotes. Particular embodiments may enable a seller to respond more quickly to RFQs, which may give the seller a competitive advantage over other sellers. Particular embodiments may reduce quote errors (such as data entry errors) and associated costs (such as underbidding costs) incurred by the seller. Particular embodiments may also reduce time requirements associated with handling "add-ons" and "re-orders" from buyers. Furthermore, particular embodiments may reduce time requirements and costs associated with generating quotes. Certain embodiments may also reduce material costs incurred as a result of the seller overlooking opportunities to purchase less expensive component parts or raw materials, opportunities to consolidate purchases to take advantage of supplier discounts, and other opportunities. In addition, particular embodiments may reduce inventory requirements associated with incorrectly ordered component parts and raw materials. Particular embodiments may similarly reduce inventory requirements associated with component parts and raw materials purchased unnecessarily from suppliers to meet supplier quantity minimums where purchases could have been consolidated, but opportunities to do so were overlooked by the seller. Particular embodiments may provide for better handling of buyer data contained in RFQs. For example, particular embodiments may provide cleansing, matching, and analyzing of buyer data contained in RFQs. Particular embodiments may also provide support for joint collaborations between buyers and sellers and between sellers and suppliers. Particular embodiments may allow a seller to better capitalize on up-sell and cross-sell opportunities. Certain embodiments may provide all, some, or none of these technical advantages, and certain embodiments may provide one or more other technical advantages.

FIG. 3 illustrates an example method for distributed quote management. The method begins at step 100, where quote module 24 receives a buyer RFQ from buyer 24. Although quote module 24 is described as performing certain tasks associated with distributed quote management, the present invention contemplates any suitable tasks associated with distributed quote management being performed by any suitable components. At step 102, quote module 24 accesses one or more buyer profiles for buyer 24 and determines whether a bid package should be generated for the received buyer RFQ. At step 104, quote module 24 explodes one or more BOMs in the buyer RFQ, which may include accessing a buyer part number for each item in the BOMs in the buyer RFQ. As described above, the buyer RFQ may include any suitable format and need not include one or more BOMs. In such cases, quote module 24 may simply access buyer part numbers for each item in the buyer RFQ directly. At step 106, quote module 24 determines whether any of the items in the buyer RFQ should be excluded from the response of seller 14 to the buyer RFQ. This may include identifying one or more items in the buyer RFQ on which seller 14 should not bid. At step 108, quote module 24 matches one or more buyer part numbers in the RFQ with one or more seller part numbers and one or more buyer supplier identifiers in the RFQ with one or more seller supplier identifiers. Matched part numbers and matched supplier identifiers may be used as needed in other steps of the method. At step 110, quote module 24 identifies items, suppliers 16, or both that are not preferred using item-specific ratings based on overall supply risk.

As described above, quote module 24 may in particular embodiments determine a best cost of an item using one of four different techniques. In such embodiments, certain techniques may be preferred over others and the technique used may depend on the availability of certain data. One such technique is used at step 112, where quote module 24 determines whether there are any contracts between buyer 12 and one or more suppliers 16 affecting prices at which one or more items are available to seller 14 from the suppliers 16 and, if there are, determines best costs of the items according to the contracts. At step 114, quote module 24 determines whether historical quote data is available for one or more items and, if there is, determines best costs of the items according to the historical quote data. As described above, a best cost of an item may in particular embodiments be determined according to historical quote data if there are no contracts (or data reflecting such contracts) between buyer 12 and one or more suppliers 16 affecting prices at which the item is available to seller 14 from suppliers 16. At step 116, quote module 24 identifies historical item pricing using open purchase orders, closed purchase orders, or both.

At step 118, quote module 24 determines whether there are any contracts between seller 14 and one or more suppliers 16 affecting prices at which one or more items are available to seller 14 from the suppliers and, if there are, determines best costs of the items according to the contracts. Matched part numbers, matched supplier identifiers, or both may be used to make such a determination. As described above, a best cost of an item may in particular embodiments be determined according to one or more contracts between seller 14 and one or more suppliers if there are no contracts (or data reflecting such contracts) between buyer 12 and one or more suppliers 16 affecting prices at which the item is available to seller 14 from suppliers and no available historical quote data for the item. At step 120, quote module 24 determines whether there are any alternative items or upgrades or downgrades available. At step 122, quote module 24 aggregates item demand from one or more buyer RFQs across key dimensions (such as commodity, buyer, customer, and any other suitable dimensions) to enable greater sourcing leverage.

At step 124, quote module 24 generates one or more seller RFQs for one or more items in the buyer RFQ. At step 126, quote module communicates the generated seller RFQ to one or more suppliers 16. At step 128, quote module 24 receives supplier responses to the seller RFQs. At step 130, quote module 24 determines best costs of the items according to the supplier responses to the seller RFQs. As described above, a best cost of an item may in particular embodiments be determined according to supplier responses seller RFQs if there are no contracts (or available data reflecting such contracts) between buyer 12 and one or more suppliers 16 affecting prices at which the item is available to seller 14 from suppliers 16, no available historical quote data for the item, and no contracts (or available data reflecting such contracts) between seller 14 and one or more suppliers 16 affecting prices at which the item is available to seller 14 from suppliers 16. If such contracts exist or historical quote data is unavailable, quote module 24 may forgo generating a seller RFQ for the item. Although quote module 24 is described as using the above techniques for determining best costs of items in a particular order and according to a particular preference scheme, these techniques may be used in any suitable order and according to any suitable preference scheme. In addition, all, some, or none of these techniques may in particular embodiments be used in combination with each other or one or more other techniques to determine a best cost of one or more items in the buyer RFQ. At step 132, quote module 24 compares identified item and supplier sourcing alternatives with each other and selects from among the identified alternatives to substantially optimize an overall quote margin.

At step 134, quote module 24 generates a quote for the buyer RFQ based on the determined best costs of the items in the buyer RFQ and other suitable information. This may include determining whether there are any buyer-specific costs that should be added to the determined best costs of the item of the buyer RFQ and adding such costs where appropriate. Because the best costs determined by quote module 24 may in particular embodiments include a low cost or an optimal cost, the quote generated by quote module 24 may reflect low or optimal costs of the items in the buyer RFQ, which may result in a more competitive quote from seller 14. As described above, generating the quote may include costing each BOM in the buyer RFQ and combining the costed BOMs. As described above, the buyer RFQ may include any suitable format and need not include one or more BOMs. In such cases, quote module 24 may generate a quote for the buyer RFQ by simply adding the determined best costs of the items in the buyer RFQ and adding any associated costs.

At step 136 quote module 24 generates a bid package for the buyer RFQ. As described above, the bid package may include a quote for the buyer RFQ, one or more identified up-sell or cross-sell opportunities, proposed contract terms, and any other suitable information regarding the buyer RFQ. At step 138, quote module 24 communicates the generated bid package to buyer 12, at which point the method ends. As described above, buyer 12 may accept or reject the bid package, negotiate with seller 14 regarding the bid package, make one or more changes to the buyer RFQ, or respond to the bid package communicated by quote module 24 in any appropriate manner. Although the steps of this example method are illustrated and described as being performed in a particular order, any suitable steps of this method may be performed in any suitable order. Furthermore, in particular embodiments some of the steps illustrated and described may not be performed and one or more additional may be performed.

Although the present invention has been described with several embodiments, sundry changes, substitutions, variations, alterations, and modifications may be suggested to one skilled in the art, and it is intended that the invention may encompass all such changes, substitutions, variations, alterations, and modifications falling within the spirit and scope of the appended claims.

What is claimed is:

1. A system for distributed quote management at a seller computer system, comprising:
one or more quote modules stored in a memory medium and collectively operable to:
receive a buyer request for quote (RFQ) from at least one buyer, the buyer RFQ requesting a quote from the seller computer system and identifying a plurality of items;
automatically access a buyer profile for the at least one buyer;
automatically determine whether historical quote data is available for at least one of the plurality of items;
if historical quote data is available, automatically determine a best cost of each of the plurality of items in the buyer RFQ according to the historical quote data;
if historical quote data is not available, automatically determine a best cost of each of the plurality of items in the buyer RFQ according to one or more contracts between the seller and one or more suppliers;
using the determined best costs of the plurality of items in the buyer RFQ, automatically generate a quote for the buyer RFQ;
automatically generate a bid package for the buyer RFQ that comprises the generated quote; and
automatically communicate the generated bid package to the at least one buyer.

2. The system of claim 1, wherein the components are operable to automatically match a buyer part number identifying an item in the buyer RFQ with one or more seller part numbers.

3. The system of claim 1, wherein the buyer RFQ comprises one or more approved supplier lists, the quote module is further operable to automatically match a buyer supplier identifier in an approved supplier list in the buyer RFQ with one or more seller supplier identifiers.

4. The system of claim 1, wherein the components are operable to automatically determine a best cost of an item in the buyer RFQ according to one or more contracts between the buyer and one or more suppliers.

5. The system of claim 1, wherein the components are operable to automatically determine a best cost of an item in the buyer RFQ according to historical quote data associated with the item.

6. The system of claim 1, wherein the components are operable to automatically determine a best cost of an item in the buyer RFQ according to one or more contracts between the seller and one or more suppliers.

7. The system of claim 1, wherein the components are operable to:
determine whether an item in the buyer RFQ is available from an inventory of the seller;
access inventory price data for the item; and
determine a best cost of the item according to the accessed inventory price data for the item.

8. The system of claim 1, wherein the components are operable to:
automatically generate one or more seller RFQs requesting a quote from one or more suppliers for an item in the buyer RFQ;
automatically communicate the one or more generated seller RFQs to one or more suppliers;
receive one or more supplier responses to the one or more seller RFQs; and
automatically determine a best cost of the item according to the one or more received supplier responses to the one or more seller RFQs.

9. The system of claim 1, wherein the quote module is further operable to:
receive one or more changes to the buyer RFQ from the at least one buyer after the bid package has been communicated to the at least one buyer;
generate a new bid package that incorporates the one or more changes into the bid package; and
communicate the new bid package to the at least one buyer.

10. The system of claim 1, wherein the components are operable to:
automatically access a buyer profile for the buyer; and
according the accessed buyer profile, automatically determine whether to generate the bid package for the buyer RFQ.

11. The system of claim 1, wherein the buyer profile comprises a profile selected from the group consisting of:
one or more win ratios of the seller computer system with the at least one buyer;
one or more sales volumes between the seller computer system and the at least one buyer; and
one or more margins on sales between the seller computer system and the at least one buyer.

12. The system of claim 1, wherein the components are operable to:
automatically identify one or more up-sell or cross-sell opportunities associated with the item; and
automatically generate a bid package for the buyer RFQ that comprises the generated quote and the one or more identified up-sell or cross-sell opportunities.

13. The system of claim 1, wherein the components are operable to:
determine whether approval is required for one or more portions of the generated bid package; and
if approval is required, obtain the required approval prior to communicating the bid package to the buyer.

14. The system of claim 1, wherein the bid package further comprises one or more proposed contract terms.

15. The system of claim 1, wherein the buyer and the seller are different departments within a single organization.

16. The system of claim 1, wherein the buyer RFQ comprises one or more bills of materials (BOMs) each identifying a plurality of items.

17. A method for distributed quote management at a seller computer system, the method comprising:
receiving a buyer request for quote (RFQ) from at least one buyer, the buyer RFQ requesting a quote from the seller computer system and identifying a plurality of items;
automatically accessing a buyer profile for the at least one buyer;
automatically determining by a processor whether historical quote data is available for at least one of the plurality of items;
if historical quote data is available, automatically determine a best cost of each of the plurality of items in the buyer RFQ according to the historical quote data;
if historical quote data is not available, automatically determine a best cost of each of the plurality of items in the buyer RFQ according to one or more contracts between the seller and one or more suppliers;

using the determined best costs of the plurality of items in the buyer RFQ, automatically generating a quote for the buyer RFQ;

automatically generating a bid package for the buyer RFQ that comprises the generated quote; and automatically communicating the generated bid package to the at least one buyer.

18. The method of claim 17, comprising automatically matching a buyer part number identifying an item in the buyer RFQ with one or more seller part numbers.

19. The method of claim 17, wherein the buyer RFQ comprises one or more approved supplier lists, the method further comprising automatically matching a buyer supplier identifier in an approved supplier list in the buyer RFQ with one or more seller supplier identifiers.

20. The method of claim 17, comprising automatically determining a best cost of an item in the buyer RFQ according to one or more contracts between the buyer and one or more suppliers.

21. The method of claim 17, comprising automatically determining a best cost of an item in the buyer REQ according to historical quote data associated with the item.

22. The method of claim 17, comprising automatically determining a best cost of an item in the buyer RFQ according to one or more contracts between the seller and one or more suppliers.

23. The method of claim 17, comprising:
determining whether an item in the buyer RFQ is available from an inventory of the seller;
accessing inventory price data for the item; and
determining a best cost of the item according to the accessed inventory price data for the item.

24. The method of claim 17, comprising:
automatically generating one or more seller RFQs requesting a quote from one or more suppliers for an item in the buyer RFQ;
automatically communicating the one or more generated seller RFQs to one or more suppliers;
receiving one or more supplier responses to the one or more seller RFQs; and
automatically determining a best cost of the item according to the one or more received supplier responses to the one or more seller RFQs.

25. The method of claim 17, further comprising:
receiving one or more changes to the buyer RFQ from the at least one buyer after the bid package has been communicated to the at least one buyer;
generating a new bid package that incorporates the one or more changes into the bid package; and
communicating the new bid package to the at least one buyer.

26. The method of claim 17, comprising:
automatically accessing a buyer profile for the buyer; and
according the accessed buyer profile, automatically determining whether to generate the bid package for the buyer RFQ.

27. The method of claim 17, wherein the buyer profile comprises a profile selected from the group consisting of:
one or more win ratios of the seller with the buyer;
one or more sales volumes between the seller and the buyer; or
one or more margins on sales between the seller and the buyer.

28. The method of claim 17, comprising:
automatically identifying one or more up-sell or cross-sell opportunities associated with the item; and automatically generating a bid package for the buyer RFQ that comprises the generated quote and the one or more identified up-sell or cross-sell opportunities.

29. The method of claim 17, comprising:
determining whether approval is required for one or more portions of the generated bid package; and
if approval is required, obtaining the required approval prior to communicating the bid package to the buyer.

30. The method of claim 17, wherein the bid package further comprises one or more proposed contract terms.

31. The method of claim 17, wherein the buyer and the seller are different departments within a single organization.

32. The system of claim 17, wherein the buyer RFQ comprises one or more bills of materials (BOMs) each identifying a plurality of items.

33. A system for distributed quote management, the system comprising one or more components stored in a memory medium and collectively operable to:
receive a buyer request for quote (RFQ) from a buyer, the buyer RFQ requesting a quote from a seller and comprising one or more bills of materials (BOMs) each comprising a plurality of items that are each identified by a buyer part number;
determine whether there are one or more contracts between the buyer and one or more suppliers affecting best costs of one or more first items in the buyer RFQ available to the seller from the one or more suppliers;
if there are one or more contracts between the buyer and one or more suppliers affecting best costs of one or more first items in the buyer RFQ available to the seller from the one or more suppliers, access the one or more contracts between the buyer and the one or more suppliers and determine the best cost of each first item according to the one or more contracts between the buyer and the one or more suppliers;
determine whether historical quote data associated with one or more second items in the buyer RFQ is available;
if historical quote data associated with one or more second items in the buyer RFQ is available, access the historical quote data and determine the best cost of each second item according to the historical quote data;
determine whether there are one or more contracts between the seller and one or more suppliers affecting best costs of one or more fourth items available to the seller from the one or more suppliers, the one or more fourth items each comprising a third item;
if there are one or more contracts between the seller and one or more suppliers affecting best costs of one or more fourth items in the buyer RFQ available to the seller from the one or more suppliers, access the one or more contracts between the seller and one or more suppliers and determine the best costs of the one or more fourth items according to the one or more contracts between the seller and the one or more suppliers;
generate one or more seller RFQs requesting a quote for one or more fifth items from one or more suppliers, communicate the one or more seller RFQs to the one or more suppliers, receive one or more supplier responses to the seller RFQs, and determine best costs of the one or more fifth items according to the supplier responses to the seller RFQs, the one or more fifth items each comprising a third item;
using the determined best costs of the plurality of items in the buyer RFQ, generate a quote for the buyer RFQ;
generate a bid package for the buyer RFQ that comprises the generated quote for the buyer RFQ; and
communicate the generated bid package to the buyer.

* * * * *